United States Patent [19]

Malon et al.

[11] Patent Number: 4,472,175
[45] Date of Patent: Sep. 18, 1984

[54] ASYMMETRIC GAS SEPARATION MEMBRANES

[75] Inventors: Raymond F. Malon, Edmundson; Anthony Zampini, St. Louis, both of Mo.

[73] Assignee: Monsanto Company, St. Louis, Mo.

[21] Appl. No.: 509,626

[22] Filed: Jun. 30, 1983

[51] Int. Cl.$^3$ .............................................. B01D 53/22
[52] U.S. Cl. ......................................... 55/16; 55/158
[58] Field of Search ................. 55/16, 158; 210/500.2

[56] References Cited

U.S. PATENT DOCUMENTS

| | | | |
|---|---|---|---|
| 3,616,607 | 11/1971 | Klass et al. | 55/16 |
| 3,657,113 | 4/1972 | Stancell et al. | 55/16 X |
| 3,709,774 | 1/1973 | Kimura | 55/16 X |
| 3,775,308 | 11/1973 | Yasuda | 210/500.2 X |
| 3,852,388 | 12/1974 | Kimura | 55/16 X |
| 3,940,469 | 2/1975 | Steigelmann et al. | 210/500.2 X |
| 3,980,456 | 9/1976 | Browall | 55/158 |
| 4,029,582 | 6/1977 | Ishii et al. | 55/16 X |
| 4,157,960 | 6/1979 | Chang et al. | 55/16 X |
| 4,230,463 | 10/1980 | Henis et al. | 55/16 |
| 4,234,528 | 11/1980 | Nussbaumer et al. | 210/500.2 X |
| 4,273,903 | 6/1981 | Rose | 210/500.2 X |

OTHER PUBLICATIONS

Hwang et al., Techniques of Chemistry, vol. VII, Membranes in Separations, Chapter 12, John Wiley & Sons, 1975.
PB 81-147787, (NTIS), Final Report Submitted to OWS&T, U.S. Department of Interior, (Cabasso).
PB 82-103920, (NTIS), Final Report Submitted to OSW&T, U.S. Department of Interior, (Cabasso).
ACS Div. of Org. Coatings and Plasticizer Chem. Papers, Cabasso, vol. 35, (1), pp. 492-497, (1975).

Primary Examiner—Robert H. Spitzer
Attorney, Agent, or Firm—Henry Croskell

[57] ABSTRACT

Asymmetric gas separation membranes of materials having selective permeation of at least one gas of a gaseous mixture over that of one or more remaining gases of the gaseous mixture, exhibit significantly improved permeation selectivities for the at least one gas when the asymmetric membrane is contacted on one or both surfaces with an effective amount of a Br nsted-Lowry acid. The improved asymmetric gas separation membranes, process for producing the improved membrane, and processes utilizing such membranes for selectively separating at least one gas from a gaseous mixture by permeation are disclosed.

28 Claims, No Drawings

ASYMMETRIC GAS SEPARATION MEMBRANES

BACKGROUND OF THE INVENTION

This invention relates to an asymmetric gas separation membrane which exhibits substantially improved gas separation selectivity and the process to produce such an improved asymmetric gas separation membrane. In another aspect, the invention relates to processes utilizing such membranes for improved selectivity in the separation of at least one gas from a gaseous mixture by permeation.

The separating, including upgrading of the concentration of at least one selective gas from a gaseous mixture, is an especially important procedure in view of the demands and the supplies of chemical feedstocks. Frequently these demands are met by separating one or more desired gases from gaseous mixtures and utilizing the gaseous products for processing. Applications have been made employing separation membranes for selectively separating one or more gases from gaseous mixtures. To achieve selective separation, the membrane exhibits less resistance to transport of one or more gases than of at least one other gas of the mixture. Thus, selective separation can provide preferential depletion or concentration of one or more desired gases in the mixture with respect to at least one other gas and therefore provide a product having a different proportion of the one or more desired gases to the at least one other gas than the proportion in the mixture. However, in order for selective separation of the one or more desired gases by the use of separation membranes to be technically feasible the membranes must satisfy several criteria so that the use of the separation procedure has utility. For instance, the membranes must be capable of withstanding the conditions to which they may be subjected during the separation operation. The membranes must also provide an adequately selective separation of one or more desired gases at a sufficiently high flux, that is, permeation rate of the permeate gas per unit surface area. Thus, separation membranes which exhibit a high flux but low selectivity separation are unattractive as they require large separating membrane surface area. Similarly, separation membranes which exhibit adequate selectivity but undesirable low fluxes are also unattractive as they require large separating membrane surface area. Furthermore, membranes which are not capable of maintaining the desired performance of flux and selectivity over an extended period of time in adverse operating environments are likewise undesirable. Adverse environmental conditions include extremes of temperature, pressure and concentration of chemical contaminants. Accordingly, research has continued to develop gas separation membranes which provide improved performance regarding the separation of one or more desired gases for an extended period of time under adverse environmental conditions.

The passage of gas through a membrane can proceed through pores, i.e. continuous channels for fluid flow and communication with both feed and exit surfaces of the membrane (which pores may or may not be suitable for separation by Knudsen flow or diffusion); in another mechanism, in accordance with current views of gas separation membrane theory the passage of a gas through the membrane may be by interaction of a gas with a material of the membrane. In this latter postulated mechanism, the permeability of a gas through a membrane is believed to involve the solubility of the gas in the membrane material and the diffusion of the gas through the membrane. The permeability constant for single gas is presently viewed as being the product of the solubility and diffusiveness of the gas in the membrane. A given membrane material has a particular permeability constant for passage of the given gas by the interaction of the gas with the material of the membrane. The rate of permeation of the gas, i.e. flux through the membrane is related to the permeability constant, but is also influenced by variables such as the membrane thickness, the physical nature of the membrane, the partial pressure differential of the permeate gas across the membrane, the temperature and the like.

In general, efforts have been directed at providing matrial of a gas separation membrane in as thin a form as possible in view of the low permeabilities of most membrane materials in order to provide adequate flux while providing a membrane as porefree as possible such that gases are passed through the membrane by interaction with the material of the membrane. One approach for developing separation membranes suitable for gaseous systems has been to provide composite membranes having the thinnest possible superimposed membranes supported on an anisotropic porous support where the superimposed ultrathin membrane provides the desired separation. The superimposed membranes are advantageously sufficiently thin, i.e. ultrathin, to provide reasonable fluxes. The essential function of a porous support is to support the superimposed membrane. Suitable supports are desirably porous to provide low resistance to permeate passage after the superimposed membrane has performed its function of selectivity separating the permeate from the feed mixture. Klass et al. U.S. Pat. No. 3,616,607; Stancell et al, U.S. Pat. No. 3,657,113; Yasuda, U.S. Pat. No. 3,775,303; and Browall, U.S. Pat. No. 3,980,456 exemplify gas separation membranes having superimposed thin membranes on a porous support.

Such composite membranes for gas separations have not been without problems. For instance, Browall discloses that in the fabrication of composite membranes of ultrathin films, fine particles, particles below about 3,000 angstroms in size, may be deposited under or between preformed ultrathin membrane layers and because of their large size in comparison to the ultrathin membranes, puncture the ultrathin membranes. Such breaches reduce the selectivity and thus the effectiveness of the membrane. The Browall patent discloses applying a preformed organopolysiloxane-polycarbonate copolymer sealing material over the ultrathin membrane to cover the breaches caused by the fine particles. Browall also discloses employing a preformed layer of the organopolysiloxane-polycarbonate copolymer between the ultrathin membranes and the porous polycarbonate support as an adhesive. Thus, the composite membranes of Browall are complex in materials and techniques of construction.

A major improvement in gas separation membranes is disclosed by Henis et al in U.S. Pat. No. 4,230,463 which pertains to particular multicomponent membranes for gas separations comprising a coating in contact with the porous separation membrane wherein the separation properties of the multicomponent membranes are principally determined by the porous separation membrane as opposed to the material of the coating. Such multicomponent membranes for the separation of at least one gas from a gaseous mixture can exhibit a desirable selectivity and still exhibit a useful flux.

Moreover, such multicomponent membranes for gas separation can be fabricated from a wide variety of gas separation membrane materials which are advantageous for a given gas separation. The desired combination of flux and selectivity of separation can be provided by the configuration and methods of preparation and combinations of the components. For instance, material having high selectivity of separation but a relatively low permeability constant can be utilized to provide multicomponent membranes having desired permeation rates and desired selectivity of separation through utilization of a porous substrate which contributes to the overall separation efficiency of the multicomponent membrane.

Despite such advances in gas membrane separations, it would be advantageous to construct any membrane, including such multicomponent membranes, from materials that have reasonably good flux and substantially improved selectivity of separation while still remaining stable in use. That is, the membrane should have high structural strength, toughness, abrasion and chemical resistance to remain functional under extremes of temperature and differential pressure. In this regard such membranes are often required to operate in pressure differentials across the membrane of at least 2100 or 3500 KPa or higher, for instance up to 13,800 KPa or even higher. In general, operation environments require membrane material which is resistant to hydrocarbons, ammonia, water, and acid gases such as carbon dioxide and hydrogen sulfide and the like. Such chemicals may have a tendency to dissolve or plasticize the material of the gas separation membranes resulting in deterioration of the membrane or densification of an otherwise asymmetric structure.

Research efforts continue in the field of gas separation membrane technology to reach economic gas separation performance utilizing asymmetric membranes of materials which have intrinsically high separation selectivity for gases such as hydrogen, carbon dioxide and the like. Attempts to eliminate surface porosity of these membrane materials in an asymmetric state by using either spinning or post treatment techniques have generally resulted in membranes, particularly hollow fiber membranes, that have poor performance gas separations either in low flux or low selectivities or both. With hollow fiber gas separation membranes spun from polymeric materials having high intrinsic selectivities for gas separations such as polyphenylene oxides, substituted polyphenylene oxides, polyimides, polyamides, polysulfones, polyethersulfones, cellulose esters, and the like, these treatments have produced modified fibers with uncoated sepration properties of interest compared to those of multicomponent coated polysulfone fibers. We have found that treatment of flat or porous hollow fiber asymmetric gas separation membranes with Brønsted-Lowry acids offers a productive and simple route to uncoated gas separation membranes having desirable separation properties of commercial utility levels.

DEFINITION OF TERMS

Separation factor ($\alpha a/b$) for a membrane for a given pair of gases a and b is defined as the ratio of the permeability constant ($P_a$) of the membrane for gas a to the permeability constant ($P_b$) of the membrane for gas b. Separation factor is also equal to the ratio of the permeability ($P_a/l$) of a membrane of thickness l for gas a of a gas mixture to the permeability of the same membrane to gas b, ($P_b/l$) wherein the permeability for a given gas is the volume of gas, standard temperature and pressure (STP), which passes through a membrane per square centimeter of surface area, per second, for a partial pressure drop of one centimeter of mercury across the membrane per unit of thickness, and is expressed as $P/l = cm^3/cm^2\text{-sec-cmHg}$.

In practice, the separation factor with respect to a given pair of gases for a given membrane can be determined employing numerous techniques which provide sufficient information for calculation of permeability constants or permeabilities for each of the pair of gases. Several of the many techniques available for determining permeability constants, permeabilities, and separation factors are disclosed by Hwang et al, Techniques of Chemistry, Vomume VII, Membranes in Separations, John Wiley & Sons, 1975 (herein incorporated by reference) at Chapter 12, pages 296 to 322.

An intrinsic separation factor as referred to herein is the separation factor for a material which has no channels for gas flow across the material and is the highest achievable separation factor for the material. Such a material may be referred to as being continuous or nonporous. The intrinsic separation factor of a material can be approximated by measuring the separation factor of a compact membrane of the material. However, several difficulties may exist in the determination of an intrinsic separation factor including imperfections introduced in the preparation of the compact membrane such as the presence of pores, the presence of fine particles in the compact membrane, undefined molecular order due to variations in membrane preparation, and the like. Consequently, the determined intrinsic separation factor can be lower than the intrinsic separation factor. Accordingly, a "determined intrinsic separation factor" as employed herein refers to the separation factor of a dry compact membrane of the material.

Dense or compact membranes are membranes which are essentially free of pores, i.e. fluid flow channels communicating between the surfaces of the membrane and are essentially free of voids, i.e. regions within the thickness of the membrane which do not contain the material of the membrane. The dense membrane is essentially the same throughout the structure, therefore it falls within the definition of isotropic membrane. On the other hand, porous separation membranes relate to membranes having continuous channels for fluid flow which communicate between the feed surface and the exit surface. Porous regions of such membranes can also extend from the surface skin or compact surface through approximately 90 to 99% of the total membrane thickness. The remaining dense region extends to the opposite surface. Asymmetric membranes have considerable internal void volume; however, this volume is not related to continuous porosity from one side of the membrane to the other. Asymmetric membranes have at least one skinned surface, i.e. a compact layer that is at an internal or external surface which is generally on one or both faces of the membrane.

For many purposes it is sufficient to say that an acid is a hydrogen containing substance which disassociates on solution in water to produce one or more hydrogen ions. More generally, however, acids are defined according to other concepts. The Brønsted-Lowry acid concept states that an acid is any compound which can furnish a proton. Non-protonic substances often possess properties such as the ability to displace a weaker acid from its compound. Lewis acids in general are defined as those acids which function as electron-pair acceptors. It is often stated that Lewis acids are a wider and more general class of substance that include Brønsted-Lowry acids as a special case. A distinction between Brønsted-Lowry and Lewis acids is that acid-base reactions in the Brønsted-Lowry sense are proton-transfer reactions since they involve only the transfer of a nucleus without the attendant electrons.

For purposes of describing this invention, the acids used are preferably Brønsted-Lowry acids; however, these acids can be in vapor or solution form and can be combined with other acids such as Lewis acids. Preferably the acids used are volatile at ambient conditions.

An "effective amount" of acid as referred to herein is used in relation to the amount of acid contacted with the asymmetric gas separation membrane. This effective amount can be varied by factors such as acid concentration, time of exposure, temperature and the like. An effective amount is herein defined as that acid contact amount sufficient to improve the asymmetric gas separation membrane selectivity but insufficient to significantly impair the mechanical integrity, strength, or other physical properties of the polymer which are detrimental to the function of the polymeric membrane as a gas separator.

SUMMARY OF THE INVENTION

The invention provides gas separation membranes comprised of asymmetric membranes exhibiting substantially improved gas separation selectivity. A preformed asymmetric gas separation membrane of material having selective permeation of at least one gas of a gaseous mixture over that of one or more remaining gases of the gaseous mixture has been found to exhibit significantly improved separation factors for the permeating gases after being contacted on one or both surfaces with a Brønsted-Lowry acid.

In addition, the invention provides for a process to produce improved asymmetric membranes in flat film or hollow fiber form having significantly improved gas separation properties, for example, comparable to or greater than the intrinsic selectivities of the polymer from which the asymmetric membrane is made and with acceptable permeation rates. It has been discovered that by treating asymmetric membranes with a Brønsted-Lowry acid, for example a hydrohaloacid, results in a modified asymmetric membrane having uncoated separation properties comparable to or higher than commercially available composite membrane separators. In addition, the invention has been found to have applications for composite separation membranes or multicomponent membranes where it is desired to eliminate surface porosity. For example, the selectivity of a multicomponent membrane can be improved by contacting one or both surfaces of the multicomponent membrane with a Brønsted-Lowry acid.

DESCRIPTION OF THE PREFERRED EMBODIMENTS

Attempts to eliminate surface defects of asymmetric gas separation membranes or even composite or multicomponent membranes have utilized spinning techniques relative to hollow fiber membranes and/or post-treatment techniques in order to improve asymmetric membrane performance. Generally, these treatment techniques have resulted in fibers that have economically poor gas fluxes or selectivities when in fact an improvement in both or at least a substantial improvement in one without seriously adversely affecting the other is desired. For example, the significant increase in $\alpha$ achievable by contacting asymmetric membranes with Brønsted-Lowry acids permits reduction in permeability up to about 50% without lowering practical use efficiencies. Hollow fibers spun from relatively good permeation polymers have been modified in various ways but without achieving significant improvement in the fluxes or selectivities for gas separations. We have found that the treatment of asymmetric membranes in either flat film or hollow fiber form with a volatile Brønsted-Lowry acid offers significant improvement in the asymmetric membrane gas separation selectivities. The Brønsted-Lowry acid treatment provides a simple route to improving asymmetric gas separation membrane performance to such a level that even uncoated hollow fibers perform at separation levels up to and greater than the intrinsic selectivity of the polymer from which the fiber is spun.

The material used for the asymmetric separation membrane may be a natural or synthetic substance having useful gas separation properties. In the case of polymers, both addition and condensation polymers which can be cast, extruded or otherwise fabricated to provide asymmetric separation membranes are included. The asymmetric separation membranes can be prepared, for example, by casting from a solution comprised of good solvent for the polymeric material into a poor or nonsolvent for the material. The spinning and/or casting conditions and/or treatments subsequent to the initial formation, and the like, can influence the morphology, i.e. the asymmetry and resistance to gas or fluid flow of the separation membranes.

Generally organic polymers, mixtures of organic polymers, or organic polymers mixed with inorganics are used to prepare the asymmetric separation membrane. Typical polymers suitable for the asymmetric separation membrane according to the invention can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(alkyl acrylates), poly(phenylene terephthalate), etc; polysulfides; polymers from monomers having alpha-olefinic unsaturation other than mentioned above such as poly(ethylene), poly(propylene), poly(butene-1), poly(4-methyl pentene-1), polyvinyls, e.g. poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Selection of the asymmetric separation membrane for improved gas separations may be made on the basis of heat resistance, solvent resistance, mechanical strength of the asymmetric separation membrane, as well as other factors indicated by the operating conditions for selective permeation, as long as the asymmetric separation membrane has the prerequisite relative separation factors in accordance with the invention for at least one pair of gases.

In making asymmetric hollow filament separation membranes, a wide variety of spinning conditions may be employed. These methods are disclosed, for example, in the preparation of polysulfone hollow filaments by Cabasso et al in Research and Development of NS-1 and Related Polysulfone Hollow Fibers for Reverse Osmosis Desalination of Seawater, supra. In addition, methods taught for preparing the porous separation membrane as disclosed in U.S. Pat. No. 4,230,463 are appropriate for preparing the preformed asymmetric separation membranes which when contacted with effective amounts of a volatile Brønsted-Lowry acid result in the improved asymmetric gas separation membranes having performance separation factors of levels up to and greater than intrinsic separation factors of the polymer from which the fiber or flat film is produced.

One polymeric material utilized in gas separations is polysulfone. More recently polysulfone material has been combined as a porous or asymmetric hollow fiber with various coatings to provide suitable gas separation characteristics. Treatment of polysulfone hollow fibers with a hydrohaloacid as a preferred Brønsted-Lowry acid results in membranes with uncoated selectivities comparable to or higher than those possible with untreated silicone coated asymmetric polysulfone membranes. Various Brønsted-Lowry acids will perform in differing ways depending upon the polymer material comprising the hollow fiber membrane; thus, varying concentrations and contact times from one acid-polymer system to another will be necessary in order to achieve the more pronounced improved selectivities according to the invention. In addition, the Brønsted-Lowry acid will be an acid which is generally volatile at ambient conditions since residual acid removal from the treated asymmetric membrane, for example by vaporization, is a preferred method for controlling and/or stopping the treatment. The acid treated membranes in flat film or hollow fiber form can be further aged or treated in, for example, nitrogen or similar sweep environments or by applying a vacuum to the fiber bore of the hollow fibers.

The acid treatment according to the invention can be carried out under a range of conditions with variations in concentrations, gas or liquid state, time, and temperature. Bundles of hollow fibers can be treated with a dilute or concentrated gaseous acid, aqueous acid, dilute acid solution or insitu produced acids. Acid exposure, for example, with hydrogen bromide for treatment of asymmetric polysulfone hollow fibers can be as short as 45 seconds for a bundle of fibers and still be very effective. The uncoated permeation properties of the fibers can be improved by exposure to approximately 0.2 molar up to about 10% by weight aqueous solution hydrogen bromide for time periods ranging from about 45 seconds up to 20 minutes or more at ambient temperatures. The acid contacted asymmetric membranes do indicate some lowering of permeation rates, for example relative to hydrogen-methane and carbon dioxide-methane separations; however, selectivity is significantly improved and in many instances higher than the intrinsic selectivity of the polysulfone polymer. Since the acid treatment is not foreseen as producing chemical changes in the polymer, such acid treatment improvements in selectivity suggest permeation modification effects by the acid. However, acid treated asymmetric membranes of polysulfone were washed in water for up to 78 hours without any essential changes in the performance of the fiber. Parallel experiments were carried out to quantify the amount of hydrohaloacids remaining in the treated hollow fiber polysulfones. Clearly the results indicated that the amount of acid in the treated hollow fibers, either before or after a water wash, was very low and probably evenly distributed throughout the polymer matrix.

The improvement of uncoated asymmetric membrane separation properties for gas separation with a Brønsted-Lowry acid treatment is a general phenomenon which has application to hollow fiber or flat film systems other than polysulfone. For example, the treatment of brominated polyphenylene oxide (PPO) fibers with hydrohaloacids such as gaseous HF, HBr and HI produces trends similar to those observed when polysulfone was treated with HCl or HBr. However, unlike polysulfone the brominated fibers showed less sensitivity to HF which was very aggressive toward the polysulfone fiber. The brominated PPO asymmmetric membranes likewise under an effective amount of acid contact with one or more surfaces of the asymmetric membrane resulted in an asymmetric membrane with separation properties comparable to those improvements found with acid contacted polysulfone. Acid treatment of asymmetric gas separation membranes produced from polyethersulfones has also resulted in positive results wherein after a short exposure of about 10 to 20 seconds in dilute solutions of HBr and HI in N-pentane produced asymmetric membranes exhibiting uncoated selectivities significantly improved over the untreated hollow fibers. In addition, the treatment of [copoly(styrene-acrylonitrile)] (hereinafter SAN) hollow fibers with HBr resulted in a dramatic improvement in uncoated asymmetric hollow fiber selectivity. SAN is not a polyether like polysulfone, polyphenylene oxide or polyethersulfone previously discussed which clearly indicates a broad application of the acid treatments. For example, an effective amount of acid treatment of any asymmetric gas separation membrane which is suitable in the selective permeation of gases is predicted to improve the selectivity properties of those membranes according to the invention. These observations justify the conclusion that the improvement of uncoated hollow fiber or flat film membrane selectivity as a result of acid treatment is applicable to many classes of polymeric membranes which have gas permeation capabilities.

Brønsted-Lowry acid treatment of hollow fiber asymmetric membranes is an interesting and yet simple approach to improving gas separation performance of uncoated hollow fiber membranes or flat membranes as well as coated membranes. Uncoated polysulfone, polyphenylene oxides, substituted polyphenylene oxides and SAN hollow fibers with selectivities comparable to or higher than that of multicomponent, or coated hollow fibers can be reproducibly produced by the acid treatment. Due to apparent fiber surface morphological changes caused by the acid, permeability is generally lower than that of coated fibers; however, substantial increases in selectivity result. The positive result appears to be quite general. The inventive asymmetric membranes are stable under testing conditions. With the hollow fibers system studied, various Brønsted-Lowry acids in general produce significant improvements in selectivity; however, hydrogen chloride and/or hydrogen bromide have produced some of the better combinations of properties for gas separations.

The following examples are illustrative of the invention but are not intended as a limitation.

The acid treated asymmetric gas separation membranes were exposed to mixed gas streams in an elongated cylindrical chamber of about 150 cc capacity. Generally, the mixed feed gas pressure was in a range of 1.68 to 7.80 atmospheres. The feed gas enters one end of the elongated test module and exits from the other end with flow rates of from one through about six liters per minute. During the performance testing the bore side of the asymmetric hollow fiber membranes is vacuum pumped from 5 to 10 minutes until the system reaches equilibrium. Permeate gas is allowed to expand into a calibrated volume for the purposes of measuring rate as a result of pressuring per unit time. The permeate gas samples are then analyzed by Gas Chromatography methods.

The 13 examples illustrated in Table 1 provide asymmetric untreated polysulfone hollow fiber controls (examples 1, 3, 7, 10, and 12) which are then treated as indicated and in accordance with the invention. Treatments include pentane dip as well as hydrohaloacid modification according to the invention; however, 100% hydrogen fluoride gas treatment for 15 minutes was found to be outside the scope of the invention in that the aggressive treatment densified the asymmetric membrane surface and destroyed both the rate and separation factor for hydrogen and methane. This destructive effect by an aggressive hydrogen fluoride is illustrated under the heading of Example 2. The hydrogen iodide 100% gas example 11 also had a densifying effect but not to the same extent as the hydrogen fluoride example 2. No attempts were made to optimize the treatment with these two aggressive acids; however, optimization of concentration and exposure time would bring the two acid treatments under the "effective amount" conditions.

Turning now to the positive results in accordance with the invention as shown in Table 1, examples 5 and 6 illustrate the significant improvements achieved by HCl gas treatment and aging of the HCl gas treated asymmetric polysulfone fibers. Examples 8 and 9 illustrate a similar improvement utilizing HBr gas and aging. Example 13 provides an additional comparative performance of a siloxane coated asymmetric polysulfone hollow fiber.

TABLE 1

UNCOATED PERMEATION PROPERTIES OF HYDROHALOACID MODIFIED ASYMMETRIC POLYSULFONE HOLLOW FIBERS

| EXAMPLE | TREATMENT | DAYS AFTER TREATMENT | $(P/l)H_2 \times 10^6$ | $H_2$ $\alpha CO$ | $H_2$ $\alpha CH_4$ |
|---|---|---|---|---|---|
| 1. Asymmetric Polysulfone Hollow Fiber | NO | — | 40 | — | 9 |
| 2. Same | 15 min. 100% HF gas | 3 | 0.1 | — | 2 |
| 3. Asymmetric Polysulfone Hollow Fiber | NO | — | 97 | 6 | — |
| 4. Same | 10 sec. Pentane dip | — | 77 | 8 | 7 |
| 5. Same | 1 hr. 100% HCl gas 1 hr. bore vacuum | — | 46 | — | 45 |
| 6. Same | same | 4 | 34 | 54 | 118 |
| 7. Asymmetric Polysulfone Hollow Fiber | NO | — | 119 | — | 4 |
| 8. Same | 15 min. 100% HBr gas | 1 | 42 | — | 79 |
| 9. Same | Same | 8 | 36 | — | 114 |
| 10. Asymmetric Polysulfone Hollow Fiber | NO | — | 43 | — | 6 |
| 11. Same | 15 min. 100% HI gas | 3 | 20 | — | 8 |
| 12. Asymmetric Polysulfone Hollow Fiber | NO | — | 126 | — | 5 |
| 13. Same | Siloxane coated | 1 | 57 | — | 69 |

Table 2 presents HBr modification of asymmetric polysulfone hollow fibers in accordance with the invention as shown in examples 17, 19, 21, 23, and 25. Examples 14, 16, 18, 20, 22, and 24 illustrate the control, untreated asymmetric polysulfone hollow fibers. The one exception is example 15 which provides a siloxane coating for comparison purposes. The control examples 18 and 20 represent the typical comparison of the untreated asymmetric polysulfone hollow fiber with a permeation rate for hydrogen of 160 vs. the same fiber when treated with HBr for 15 minutes in a 2% by volume HBr/nitrogen stream resulting in a permeation rate for hydrogen of 62; however, the separation factor for hydrogen vs. methane is improved from 4 to 98 (example 19). The improvement of selectivity is 25 fold at a cost of approximately 60% of permeation rate. These uncoated permeation performances of HBr modified asymmetric polysulfone hollow fibers are indeed attractive for many gas separation applications.

TABLE 2

UNCOATED PERMEATION PROPERTIES OF HBr MODIFIED ASYMMETRIC POLYSULFONE HOLLOW FIBERS

| EXAMPLES | TREATMENT | DAYS AFTER TREATMENT | $(P/l)H_2$ | $(P/l)CO_2$ | $H_2$ $\alpha CH_4$ | $CO_2$ $\alpha CH_4$ |
|---|---|---|---|---|---|---|
| 14. Asymmetric Polysulfone Hollow Fiber | — | — | 126 | | 5 | |
| 15. Same | Siloxane Coated | 1 | 57 | 24 | 69 | 30 |
| 16. Asymmetric Polysulfone Hollow Fiber | — | — | 124 | | 4 | |
| 17. Same | 20 min. in 0.2% by vol. HBr/N₂ | 9 | 50 | | 89 | |
| 18. Asymmetric Polysulfone Hollow Fiber | — | — | 160 | | 4 | |
| 19. Same | 15 min. 2% by vol. HBr/N₂ | 4 | 62 | 21 | 98 | 34 |
| 20. Asymmetric Polysulfone Hollow Fiber | — | — | 119 | | 4 | |
| 21. Same | 15 min. 100% HBr | 1 | 42 | 14 | 79 | 34 |
| 22. Asymmetric Polysulfone Hollow Fiber | — | — | 110 | | 6 | |
| 23. Same* | 5 min. in 10% by wt. HBr(aq) | 1 | 61 | | 85 | |
| 24. Asymmetric Polysulfone Hollow Fiber | — | — | 74 | | 11 | |
| 25. Same | 45 sec. in ~0.02 N HBr in Pentane | 1 | 40 | 12 | 119 | 38 |

*PRETREATMENT WITH 1% BY WT. AQUEOUS HBr

The results demonstrated in Table 2 provide a range of acid treatment conditions. Fiber bundles can be treated with dilute or concentrated gaseous acid, aqueous acid, or a dilute hydrocarbon acid solution. Acid exposures as short as 45 seconds were found to be effective. An acid concentration of only 0.02 is molar in a hydrocarbon solution were also found to be effective at the short exposure time of 45 seconds.

Examples 26 through 33 as found in Table 3 demonstrate the effectiveness of the invention regarding hydrohaloacid modification of asymmetric brominated PPO hollow fibers with Examples 26, 28, 30, and 32 being untreated hollow fibers of brominated PPO which are then treated as indicated (examples 29, 31, and 33). The improvement of uncoated fiber separation properties with a hydrohaloacid treatment provides a general phenomenon applicable to fiber systems other than polysulfone as demonstrated by the data of Table 3. For example, the treatment of brominated PPO fibers with gaseous HF, HBr, and HI produce trends similar to those observed when polysulfone was treated with HCl or HBr. However, unlike polysulfone, the brominated fibers are not destroyed by aggressive treatments with HF and HI.

TABLE 3

UNCOATED PERMEATION PROPERTIES OF HYDROHALOACID MODIFIED ASYMMETRIC BPPO HOLLOW FIBERS

| | | After 3 days | | After 60 days | |
|---|---|---|---|---|---|
| EXAMPLES | TREATMENT | $(P/l)H_2 \times 10^6$ | $H_2$ $\alpha CH_4$ | $(P/l)H_2 \times 10^6$ | $H_2$ $\alpha CH_4$ |
| 26. Asymmetric BrPPO | — | 182 | 7 | — | — |
| 27. Same | Siloxane Coated | 95 | 41 | — | — |
| 28. Asymmetric BrPPO | — | 127 | 6 | — | — |
| 29. Same | 15 min. 100% HF Gas | 26 | 47 | 20 | 66 |
| 30. Asymmetric BrPPO | — | 126 | 7 | — | — |
| 31. Same | 15 min 100% HBr Gas | 54 | 70 | 32 | 93 |
| 32. Asymmetric BrPPO | — | 117 | 5 | — | — |
| 33. Same | 15 min 100% HI gas | 51 | 56 | 19 | 62 |

Additional asymmetric gas separation hollow fiber membranes are demonstrated in Table 4 wherein membranes of polyethersulfone were treated with various hydrocarbon hydrohaloacid solutions. Examples 34, 36, 38, 40, and 43 represent the untreated asymmetric gas separation membranes of polyethersulfone which are then treated as indicated (examples 37, 39, 41, 42, 44, and 45). Under the treating conditions of Table 4, Example 39 appears to be the less significant improvement when 0.02 molar HCl in normal pentane results only in an improvement of separation factor for hydrogen over methane of approximately 200%. This result is, for example, low compared to Example 41 wherein 0.02 molar HBr in normal pentane treatment of asymmetric polyethersulfone resulted in an improvement of separation factor for hydrogen over methane from 3.3 to 147. The data of these tables indicate that through optimization the inventive results are far ranging and significantly improve separation factors of uncoated asymmetric gas separation membranes.

modification effect is partially influenced by prolonged water wash or immersion; however, the resulting permeation rate and selectivity of the water wash fibers are essentially the same as those of coated fibers.

TABLE 5

EFFECT OF WATER IMMERSION ON THE UNCOATED PERMEATION PROPERTIES OF AN HBr MODIFIED POLYSULFONE FIBER

| BUNDLE | TREATMENT | DAYS AFTER TREATMENT | $(P/l)H_2 \times 10^6$ | $\alpha H_2/CH_4$ |
|---|---|---|---|---|
| 50. Asymmetric Polysulfone | — | — | 46 | 9 |
| 51. Same | 15 min 100% HBr | 5 | 40 | 82 |
| 52. Same | Immersed 78 hr in water - dried 4 days | 12 | 43 | 61 |
| 53. Asymmetric Polysulfone | — | — | 47 | 5 |
| 54. Same | Siloxane coated | 1 | 37 | 64 |

As found with the other polymeric asymmetric gas separation hollow fiber systems, the treatment of SAN fibers with HBr also resulted in a dramatic improvement in uncoated fiber selectivity as demonstrated in Table 6. Since the SAN polymer unlike polysulfone,

TABLE 4

UNCOATED PERMEATION PROPERTIES OF HYDROHALOACID MODIFIED ASYMMETRIC POLYETHERSULFONE HOLLOW FIBERS

| EXAMPLE | TREATMENT | DAYS AFTER TREATMENT | $(P/l)H_2 \times 10^6$ | $(P/l)CO_2 \times 10^6$ | $H_2 \, \alpha CH_4$ | $CO_2 \, \alpha CH_4$ |
|---|---|---|---|---|---|---|
| 34. Asymmetric Polyethersulfone | NO | — | 41 | — | 5 | — |
| 35. Same | Siloxane coated | 1 | 29 | 12 | 105 | 51 |
| 36. Asymmetric Polyethersulfone | NO | — | 54 | — | 4 | — |
| 37. Same | 2-10 sec. dips in 0.02 M HF/n-C$_5$ and overnight bore vacuum | 1 | 31 | 10 | 22 | 8 |
| 38. Asymmetric Polyethersulfone | NO | — | 72 | — | 4 | — |
| 39. Same | 2-10 sec. dips in 0.02 M HCl/n-C$_5$ and overnight bore vacuum | 1 | 37 | 11 | 7 | 2 |
| 40. Asymmetric Polyethersulfone | NO | — | 79 | — | 3 | — |
| 41. Same | 2-10 sec. dips in 0.02 M HBr/n-C$_5$ and overnight bore vacuum | 1 | 27 | 7 | 147 | 46 |
| 42. Same | Same | 6 | 26 | — | 35.0 | — |
| 43. Asymmetric Polyethersulfone | NO | — | 63 | — | 4 | — |
| 44. Same | 2-5 sec. dips in 0.016 M HI/n-C$_5$ and 4 hr. bore vacuum | 4 hr. | 23 | — | 93 | — |
| 45. Same | Same | 4 | 26 | — | 27 | — |

The acid treatments of asymmetric gas separation membranes according to the invention appear to be impacted by residual acid even in very small amounts as indicated in Table 5 by Examples 51 and 52. The HBr treated fiber was immersed in water for 78 hours and indeed resulted in the overall reduction of separation factor for hydrogen over methane from 82 to 61 and rate improved slightly from 40 to 43. It can be readily seen from the results of Table 5 that the permeation polyphenylene oxide derivatives and polyethersulfone is not a polyether, these results indicate that the invention has broad application and is beyond one generic class of polymeric materials. The data illustrates that the improvement of uncoated fiber selectivity with acid treatment has general application to many classes of polymers from which asymmetric gas separation hollow fibers are made.

TABLE 6

UNCOATED PERMEATION PROPERTIES OF HYDROHALOACID MODIFIED ASYMMETRIC SAN HOLLOW FIBERS

| EXAMPLE | TREATMENT | DAYS AFTER TREATMENT | $(P/l)H_2 \times 10^6$ | $(P/l)CO_2 \times 10^6$ | $H_2 \, \alpha CH_4$ | $CO_2 \, \alpha CH_4$ |
|---|---|---|---|---|---|---|
| 46. Asymmetric SAN | NO | — | 145 | 43 | 2 | 1 |
| 47. Same | Siloxane Coated | 4 | 46 | 10 | 86 | 18 |
| 48. Asymmetric SAN | NO | — | 35 | — | 5 | — |
| 49. Same | 2% by volume HBr/N$_2$ for 15 min. and overnight bore | 2 | 17 | 2 | 380 | 42 |

TABLE 6-continued

UNCOATED PERMEATION PROPERTIES OF HYDROHALOACID MODIFIED ASYMMETRIC SAN HOLLOW FIBERS

| EXAMPLE | TREATMENT | DAYS AFTER TREATMENT | $(P/l)H_2 \times 10^6$ | $(P/l)CO_2 \times 10^6$ | $H_2$ $\alpha CH_4$ | $CO_2$ $\alpha CH_4$ |
|---|---|---|---|---|---|---|
| | vacuum | | | | | |

Table 7 provides for elemental Br analysis results of HBr treated polysulfone asymmetric gas separation hollow fibers wherein the equipment used in the analysis is accurate down to 10 ppm bromine. The untreated and various treated fibers were analyzed after aging under various conditions including dry aging and water aging. In all three treated fibers the weight percent of Br in the fiber ranges from 0.04 to 0.08. The HBr treated fiber bundles as found in Table 5 were sacrificed for the analysis as shown in Table 7. Clearly, the amount of Br in the treated fibers, either before or after a water wash is very low.

TABLE 7

ELEMENTAL Br ANALYSIS RESULTS OF AN HBr TREATED POLYSULFONE FIBER

| Sample | Wt. % Br |
|---|---|
| Untreated Fiber | Less than 0.01 |
| HBr Treated | 0.08 |
| HBr Treated, Vacuum Dried, 4 days @ 64° | 0.04 |
| HBr Treated, 4 days in water @ 25° | 0.06 |

Uncoated permeation properties of organic, Brønsted-Lowry acid modified asymmetric polysulfone hollow fibers are presented in Table 8. Again, the improvements according to the invention are demonstrated in examples 56 and 58. Both organic acids were combined with normal pentane before contact with the untreated asymmetric polysulfone hollow fibers presented as examples 55 and 57.

TABLE 8

UNCOATED PERMEATION PROPERTIES OF ORGANIC BRØNSTED-LOWRY ACID MODIFIED ASYMMETRIC POLYSULFONE HOLLOW FIBERS

| EXAMPLE | TREATMENT | DAYS AFTER TREATMENT | $(P/l)H_2 \times 10^6$ | $(P/l)CO_2 \times 10^6$ | $H_2$ $\alpha CH_4$ | $CO_2$ $\alpha CH_4$ |
|---|---|---|---|---|---|---|
| 55. Asymmetric Polysulfone | No | — | 79 | — | 5 | — |
| 56. Same* | 2% by wt. HOAC/n-$C_5$ | 2 | 43 | — | 15 | — |
| 57. Asymmetric Polysulfone | No | — | 64 | — | 4 | — |
| 58. Same | 5% by wt. $F_3CCOOH$/n-$C_5$ | 2 | 41 | — | 55 | — |

*FIBERS PRETREATED WITH .5% BY WT. HOAC/n-$C_5$

Uncoated asymmetric polysulfone hollow fiber gas separation membranes, Examples 59, 61, and 63, were treated by insitu produced hydrohaloacids as indicated by example 60, 62, and 64. Results illustrate substantial improvements in selectivity with minimum reductions in permeation rate.

TABLE 9

UNCOATED PERMEATION PROPERTIES OF INSITU PRODUCED HYDROHALOACID MODIFIED ASYMMETRIC POLYSULFONE HOLLOW FIBERS

| EXAMPLE | TREATMENT | DAYS AFTER TREATMENT | $(P/l)H_2 \times 10^6$ | $(P/l)CO_2 \times 10^6$ | $H_2$ $\alpha CH_4$ | $CO_2$ $\alpha CH_4$ |
|---|---|---|---|---|---|---|
| 59. Asymmetric Polysulfone | NO | — | 69 | — | 6 | — |
| 60. Same | 20 sec. $HSiCl_3/N_2$ | 1 | 49 | — | 42 | — |
| 61. Same | NO | — | 68 | — | 2 | — |
| 62. Same | 20 sec. $HSiCl_3/N_2$ | 1 | 55 | — | 41 | — |
| 63. Same | NO | — | 58 | — | 3 | — |
| 64. Same | 20 sec. $H_3CSiCl_3/N_2$ | 1 | 50 | — | 46 | — |

Permeation properties of coated and uncoated asymmetric polysulfone membranes before and after treatment with Brønsted-Lowry acids are presented in Table 10. These acid treated membranes were also tested for hydrocarbon degradation resistance as illustrated in examples 68, 71, and 73. Acid treated polysiloxane coated membranes, example 70, demonstrate an improvement in $\alpha H_2/CO$ over the coated untreated membranes of example 69. The acid treated, coated membranes also presented greater hydrocarbon degradation resistance as illustrated in examples 71 and 73. The $\alpha H_2/CO$ of hydrocarbon treated-acid membrane (example 71) is 32 vs. 18 for example 73 which was not acid treated.

TABLE 10

COATED AND UNCOATED PERMEATION PROPERTIES OF BRØNSTED-LOWRY ACID MODIFIED ASYMMETRIC POLYSULFONE HOLLOW FIBERS

| EXAMPLE | TREATMENT | DAYS AFTER TREATMENT | $(P/l)/H_2$ | $\alpha H_2/CO$ |
|---|---|---|---|---|
| 65. Asymmetric Polysulfone | No | — | 140 | 5 |
| 66. Same | Three 5 second pentane dips | 1 | 79 | 10 |
| 67. Same | 16 hours in 560 mm HCl gas | 1 | 61 | 33 |

TABLE 10-continued

COATED AND UNCOATED PERMEATION PROPERTIES OF BRØNSTED-LOWRY
ACID MODIFIED ASYMMETRIC POLYSULFONE HOLLOW FIBERS

| EXAMPLE | TREATMENT | DAYS AFTER TREATMENT | $(P/l)/H_2$ | $\alpha H_2/CO$ |
|---|---|---|---|---|
| 68. (Example 67 product) | 16 hours in 7% toluene by volume in n-hexane | — | 55 | 20 |
| 69. Asymmetric Polysulfone | coated with 1% by wt. Sylgard in pentane | 1 | 59 | 39 |
| 70. (Example 69 product) | 16 hours in 560 mm HCl gas | — | 53 | 43 |
| 71. (Example 70 product) | 16 hours in 7% by vol. Toluene/normal hexane | — | 50 | 32 |
| 72. Asymmetric Polysulfone | Coated with 1% by wt. Sylgard in pentane | 1 | 73 | 40 |
| 73. (Example 72 Product) | 16 hours in 7% by vol. toluene/normal hexane | — | 65 | 18 |

Permeation properties of uncoated asymmetric polysulfone membranes before and after treatment with a 50-50% by volume of a Brønsted-Lowry acid and a Lewis acid mixture are presented in Table 11. A full strength HBr and BF$_3$ (non-diluted) 50-50 blend was contacted for 2 minutes with an asymmetric polysulfone hollow fiber demonstrating a significant improvement in $\alpha H_2/CH_4$. The combination of high strength acid concentration and time produced an unsatisfactory impact on P/l while increasing $\alpha H_2/CH_4$ by greater than 400% indicating possible densification effects. Adjustments of concentration and/or contact time would provide results more in balance with the preferred balances achievable according to the invention, i.e. greater than 100% increases in $\alpha$ with less than 50% reduction of permeability.

TABLE 11

UNCOATED PERMEATION PROPERTIES OF ASYMMETRIC POLYSULFONE HOLLOW
FIBERS AND AS MODIFIED BY A MIXTURE OF BRØNSTED-LOWRY AND LEWIS ACIDS

| EXAMPLE | TREATMENT | DAYS AFTER TREATMENT | P/l $H_2 \times 10^6$ | $\alpha H_2/CH_4$ |
|---|---|---|---|---|
| 74. Asymmetric Polysulfone | — | — | 49 | 9.3 |
| 75. Same | 2 min. 50% HBr 50% BF$_3$ (by volume) Bore vacuum for 12 hours after treatment | 1 | 12 | 41.0 |

A summary is presented in Table 12 for uncoated permeation properties of Brønsted-Lowry acid treated asymmetric polysulfone hollow fibers. First, an untreated asymmetric polysulfone hollow fiber range is illustrated for permeation rate and hydrogen separation factor for hydrogen over CO and hydrogen over methane. This presentation is followed by the performance of a siloxane coated asymmetric polysulfone hollow fiber with rates for hydrogen, CO$_2$ and oxygen and separation factors for hydrogen over CO, hydrogen over methane, CO$_2$ over methane and oxygen over nitrogen. Summary data according to the invention is provided for HCl and HBr treated polysulfone asymmetric membranes for all the above permeation rates and selectivities. The last item of interest of the summary of Table 12 provides an intrinsic separation factor for dense polysulfone wherein separation factor for hydrogen over CO and hydrogen over methane are illustrated.

TABLE 12

SUMMARY - UNCOATED PERMEATION PROPERTIES OF HYDROHALOACID
TREATED ASYMMETRIC POLYSULFONE HOLLOW FIBERS

| | TREATMENT | $(P/l)H_2$ | $(P/l)CO_2$ | $(P/l)O_2$ | $H_2 \alpha CO$ | $H_2 \alpha CH_4$ | $CO_2 \alpha CH_4$ | $O_2 \alpha N_2$ |
|---|---|---|---|---|---|---|---|---|
| Asymmetric Polysulfone | NO | 70–140 | — | — | ~5 | ~5 | — | — |
| Same | Siloxane Coated | 57–75 | 24 | 6–9 | 30–35 | 69–80 | 30 | 4.5 |
| Same | HCl or HBr | 30–70 | 10–19 | 3 | 33–54 | 45–119 | 30–38 | 6.6 |
| Same | Intrinsic values for dense polysulfone | — | — | — | 30–35 | 60–70 | — | — |

The summary data of Table 12 demonstrates that the separation factor for hydrogen over CO for the hydrohaloacid treated polysulfone asymmetric separation membrane is approximately equal to or greater than the intrinsic separation factor for hydrogen over CO for dense polymeric polysulfone. The separation factor for hydrogen over methane in the same comparison demonstrates that the acid treated polysulfone asymmetric membrane provides a separation factor for hydrogen over methane of slightly below to significantly above the intrinsic dense polysulfone values. In addition, these same separation factors are equal to or significantly greater than silicone coated asymmetric polysulfone.

The hydrohaloacid treatment of asymmetric gas separation hollow fiber membranes is a very simple and productive way of significantly improving the selectivity of uncoated fibers. The uncoated asymmetric polysulfone, brominated PPO, and SAN hollow fibers with selectivities comparable to or higher than that of silicone coated fibers have been reproducibly produced by the methodology of the invention. The acid treated uncoated asymmetric gas separation membranes were stable under test conditions. Optimization of any particular polymer and Brønsted-Lowry acid will provide significantly improved separation factors for preformed asymmetric gas separation membranes which have exhibited selectivities for at least one gas from a mixture of gases which is in accordance with the present invention.

The foregoing description of the several embodiments of this invention as described above is not intended as limiting of this invention. As will be apparent to those skilled in the art, the inventive concepts set forth herein can find many applications in the art of membrane gas separations and many variations on and modifications to the embodiments described herein may be made without departing from the spirit and scope of this invention.

We claim:

1. An asymmetric gas separation membrane exhibiting substantially improved gas separation selectivity comprising, a preformed asymmetric separation membrane of material having selective permeation of at least one gas of a gaseous mixture over that of one or more remaining gases of the gaseous mixture which has been contacted on one or both surfaces with an effective amount of a Brønsted-Lowry acid, wherein with respect to the at least one gas, the acid contacted membrane exhibits a separation factor significantly greater than the separation factor exhibited by the membrane before acid contact.

2. The improved asymmetric gas separation membrane of claim 1 wherein the Brønsted-Lowry acid is a hydrohaloacid.

3. The improved asymmetric gas separation membrane of claim 1 wherein the separation factor for the one gas of the gas mixture is increased by at least 100%.

4. The improved asymmetric gas separation membrane of claim 2 wherein the improvement in separation factor for the one gas of the gas mixture is accomplished with a reduction in permeability of not more than about 50%.

5. The improved asymmetric gas separation membrane of claim 1 wherein the material of the asymmetric membrane is comprised of a material selected from the group consisting of polymers and copolymers and substituted polymers of polyethers, polysulfones, polyaryleneoxides, polyethersulfones, cellulose esters, and copolymers of styrene and acrylonitrile.

6. The improved asymmetric gas separation membrane of claim 1 wherein the at least one gas is selected from the group consisting of carbon monoxide, nitrogen, oxygen, helium, methane, ethane, hydrogen, and carbon dioxide.

7. The improved asymmetric gas separation membrane according to claim 1 wherein the separation factor for the separation of hydrogen from a gaseous mixture comprised of hydrocarbons of 1 to about 5 carbon atoms is improved by at least about 200%.

8. The improved asymmetric gas separation membrane according to claim 7 wherein the separation factor for the separation of hydrogen from a gaseous mixture comprised of hydrocarbons of 1 to about 5 carbon atoms is greater than the intrinsic separation factor of the membrane material in dense film form.

9. The improved asymmetric gas separation membrane according to claim 1 wherein the improved acid contacted asymmetric membrane exhibits a separation factor for the separation of $CO_2$ from methane of at least about 200% over the non-acid treated asymmetric membrane.

10. The improved asymmetric gas separation membrane according to claim 1 wherein the Brønsted-Lowry acid is mixed with a Lewis acid.

11. A process for improving the selectivity of an asymmetric gas separation membrane of material exhibiting selective permeation of at least one gas of a gaseous mixture over that of one or more remaining gases of the gaseous mixture comprising:

contacting the preformed asymmetric gas separation membrane with an effective amount of a Brønsted-Lowry acid which is volatile at ambient conditions, the acid being contacted with one or both surfaces of the membrane for a period sufficient with respect to the at least one gas to improve the separation factor significantly greater than the separation factor exhibited by the membrane before acid treatment; and removing the residual acid through vaporization.

12. The process according to claim 11 wherein the Brønsted-Lowry acid is a hydrohaloacid and the contact time for the acid with the preformed asymmetric gas separation membrane varies from about 15 seconds to about 30 minutes.

13. The process according to claim 11 wherein the Brønsted-Lowry acid is in a vapor state when contacted with the preformed asymmetric gas separation membrane.

14. The process according to claim 11 wherein the Brønsted-Lowry acid is in a liquid state when contacted with the preformed asymmetric gas separation membrane.

15. The process according to claim 11 wherein the improved asymmetric gas separation membrane is washed after acid removal and aged in a nitrogen environment from about 2 hours to about 24 hours.

16. The process according to claim 11 wherein the material of the preformed asymmetric gas separation membrane is comprised of a material selected from the group consisting of polymers and copolymers and substituted polymers of polyethers, polysulfone, polyethersulfone, polyphenylene oxide, styrene acrylonitrile copolymers, and cellulose acetate.

17. The process according to claim 11 wherein the acid is a mixture of Brønsted-Lowry and Lewis acids.

18. A process for improving the selectivity of a multicomponent membrane for gas separations wherein an asymmetric membrane is coated with one or more materials, said multicomponent membrane exhibiting selectivity permeation of at least one gas of a gaseous mixture over that of one or more remaining gases of the gaseous mixture comprising, contacting the preformed multicomponent gas separation membrane with an effective amount of a Brønsted-Lowry acid which is volatile at ambient conditions, the acid being contacted with one or both surfaces of the multicomponent membrane for a period sufficient with respect to the at least one pair of gases to improve the separation factor.

19. The process according to claim 18 wherein the improved multicomponent gas separation membrane is contacted with a hydrohaloacid for a period varying from about 15 seconds to about 30 minutes.

20. The process according to claim 18 wherein the acid is in a vapor state when contacted with the preformed multicomponent gas separation membrane.

21. The process according to claim 18 wherein the acid is in a liquid state when contacted with the multicomponent gas separation membrane, the acid being volatile at ambient conditions.

22. The process according to claim 18 wherein the acid is a mixture of Brønsted-Lowry and Lewis acids.

23. The process according to claim 18 wherein the improved multicomponent gas separation membrane is washed after acid removal and aged in a nitrogen environment from about 2 hours to about 24 hours.

24. A multicomponent gas separation membrane exhibiting improved gas separation selectivity and resistance to hydrocarbons degradation, comprising, an asymmetric membrane coated with one or more materials, said membrane having selective permeation of at least one of a gaseous mixture over that of one or more remaining gases of the gaseous mixture which has been contacted on one or both surfaces with an effective amount of a Brønsted-Lowry acid, wherein with respect to the at least one gas, the acid contacted multicomponent gas separation membrane exhibits an improved separation factor greater than the separation factor exhibited by the multicomponent gas separation membrane before acid treatment.

25. The improved membrane of claim 24 wherein the Brønsted-Lowry acid is a hydrohaloacid.

26. The improved membrane of claim 24 wherein the improvement in separation factor for the one gas of the gas mixture is accomplished without reduction in permeability.

27. A process for separating at least one gas of a gaseous mixture from at least one other gas and said gaseous mixture by selective permeation and providing a permeated product containing at least one permeating gas comprising:

contacting the gaseous mixture with one surface of an asymmetric gas separation membrane exhibiting substantially improved gas separation selectivity, the asymmetric gas separation membrane having been contacted on one or both surfaces with an effective amount of a Brønsted-Lowry acid, wherein with respect to the at least one gas, the acid contacted asymmetric separation membrane exhibits an improved separation factor significantly greater than the separation factor exhibited by the asymmetric membrane before acid treatment; and removing from the vicinity of an opposite surface from the contact surface, a permeated product having a different proportion of said at least one gas of said gaseous mixture to said at least one other gas of said gaseous mixture than the proportion of the gaseous mixture of said at least one gas to said at least one other gas.

28. A process for separating at least one gas in a gaseous mixture from at least one other gas in said gaseous mixture by selective permeation and providing a permeated product containing at least one permeating gas by contacting the gaseous mixture with one surface of a multicomponent gas separation membrane exhibiting improved gas separation selectivity and resistance to hydrocarbons which is comprised of an asymmetric membrane coated with one or more materials, said membrane having selective permeation of at least one of a gaseous mixture over that of one or more remaining gases of the gaseous mixture which has been contacted on one or both surfaces with a Brønsted-Lowry acid, wherein with respect to the at least one gas, the acid contacted multicomponent gas separation membrane exhibits an improved separation factor greater than the separation factor exhibited by the multicomponent gas separation before acid treatment; and removing from the vicinity of an opposite, noncontacted membrane surface a permeated product having a different proportion of said at least one gas of said gaseous mixture to said at least one other gas of said gaseous mixture than the proportion in the gaseous mixture of said at least one gas to said at least one other gas.

* * * * *